United States Patent
Morini et al.

(10) Patent No.: US 8,071,499 B2
(45) Date of Patent: Dec. 6, 2011

(54) CATALYST COMPONENTS FOR THE POLYMERIZATION OF OLEFINS AND CATALYSTS THEREFROM OBTAINED

(75) Inventors: Giampiero Morini, Padua (IT); Tiziano Dall'Occo, Ferrara (IT); Dario Liguori, Forino (IT); Joachim T. M. Pater, Ferrara (IT); Gianni Vitale, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 0 days.

(21) Appl. No.: 12/448,289

(22) PCT Filed: Dec. 11, 2007

(86) PCT No.: PCT/EP2007/063707
§ 371 (c)(1),
(2), (4) Date: Jun. 16, 2009

(87) PCT Pub. No.: WO2008/077770
PCT Pub. Date: Jul. 3, 2008

(65) Prior Publication Data
US 2009/0306316 A1  Dec. 10, 2009

Related U.S. Application Data

(60) Provisional application No. 60/876,737, filed on Dec. 22, 2006.

(30) Foreign Application Priority Data

Dec. 22, 2006 (EP) ..................................... 06127075

(51) Int. Cl.
*B01J 31/00* (2006.01)
*C08F 4/06* (2006.01)
*C08F 4/44* (2006.01)
*C08F 2/00* (2006.01)

(52) U.S. Cl. ........ 502/132; 502/103; 502/129; 502/156; 502/172; 526/113; 526/124.3; 526/210

(58) Field of Classification Search .................. 526/352; 502/132
See application file for complete search history.

(56) References Cited

U.S. PATENT DOCUMENTS

| 4,399,054 | A | 8/1983 | Ferraris et al. |
| 4,469,648 | A | 9/1984 | Ferraris et al. |
| 4,829,034 | A | 5/1989 | Iiskolan et al. |
| 4,971,937 | A | 11/1990 | Albizzati et al. |
| 5,095,153 | A | 3/1992 | Agnes et al. |
| 5,100,849 | A | 3/1992 | Miya et al. |
| 5,221,651 | A | 6/1993 | Sacchetti et al. |
| 5,585,317 | A | 12/1996 | Sacchetti et al. |
| 5,698,642 | A | 12/1997 | Govoni et al. |
| 5,733,987 | A | 3/1998 | Covezzi et al. |
| 6,127,304 | A | 10/2000 | Sacchetti et al. |
| 6,225,420 | B1 | 5/2001 | Palmqvist et al. |
| 6,228,956 | B1 | 5/2001 | Covezzi et al. |
| 6,323,152 | B1 | 11/2001 | Sacchetti et al. |
| 6,388,028 | B2 | 5/2002 | Sacchetti et al. |
| 6,407,028 | B1 | 6/2002 | Sacchetti et al. |
| 6,413,477 | B1 | 7/2002 | Govoni et al. |
| 6,437,061 | B1 | 8/2002 | Sacchetti et al. |
| 6,458,911 | B1 * | 10/2002 | Ong et al. .................. 526/348.1 |
| 6,627,710 | B1 | 9/2003 | Sacchetti et al. |
| 6,686,307 | B2 | 2/2004 | Sacchetti et al. |
| 7,223,711 | B2 | 5/2007 | Sacchetti et al. |
| 7,465,688 | B2 | 12/2008 | Guidotti et al. |
| 2007/0275850 | A1 | 11/2007 | Brita et al. |

FOREIGN PATENT DOCUMENTS

| EP | 361493 | 4/1990 |
| EP | 361494 | 4/1990 |
| EP | 395083 | 10/1990 |
| EP | 0601525 A1 * | 12/1993 |
| EP | 601525 | 6/1994 |
| EP | 601525 A1 * | 6/1994 |
| EP | 728769 | 8/1996 |
| EP | 1518866 | 3/2005 |
| EP | 1518866 A1 * | 3/2005 |
| WO | 92/21706 | 12/1992 |
| WO | 93/03078 | 2/1993 |
| WO | 97/22633 | 6/1997 |
| WO | 98/44009 | 10/1998 |
| WO | 00/78820 | 12/2000 |
| WO | WO 0078820 A1 * | 12/2000 |
| WO | 01/85803 | 11/2001 |
| WO | 2008/074674 | 6/2008 |

* cited by examiner

*Primary Examiner* — David W Wu
*Assistant Examiner* — Elizabeth Eng
(74) *Attorney, Agent, or Firm* — Dilworth IP, LLC

(57) ABSTRACT

A catalyst component comprising Ti, Mg, Al, Cl, and optionally $OR^I$ groups in which $R^I$ is a C1-C20 hydrocarbon group, optionally containing heteroatoms, up to an amount such as to give a molar $OR^I$/Ti ratio lower than 0.5, characterized by the fact that substantially all the titanium atoms are in valence state of 4, that the porosity ($P_F$), measured by the mercury method and due to pores with radius equal to or lower than 1 µm, is at least 0.3 cm$^3$/g, and by the fact that the Cl/Ti molar ratio is lower than 29.

The said catalysts are characterized by high morphological stability under the low molecular weight ethylene polymerization conditions while at the same time maintaining characteristics of high activity.

10 Claims, No Drawings

CATALYST COMPONENTS FOR THE POLYMERIZATION OF OLEFINS AND CATALYSTS THEREFROM OBTAINED

This application is the U.S. national phase of International Application PCT/EP2007/063707, filed Dec. 11, 2007, claiming priority to European Application 06127075.7 filed Dec. 22, 2006 and the benefit under 35 U.S.C. 119(e) of U.S. Provisional Application No. 60/876,737, filed Dec. 22, 2006; the disclosures of International Application PCT/EP2007/063707, European Application 06127075.7 and U.S. Provisional Application No. 60/876,737, each as filed, are incorporated herein by reference.

The present invention relates to catalyst components for the polymerization of olefins $CH_2=CHR$, wherein R is hydrogen or hydrocarbon radical having 1-12 carbon atoms. In particular, the invention relates to catalyst components suitable for the preparation of homopolymers and copolymers of ethylene and to the catalysts obtained therefrom. Furthermore, the invention relates also to ethylene homo or copolymers having high fluidity in the molten state and good morphological properties and to broad molecular weight ethylene polymers with spherical form and good morphology.

In particular the present invention relates to a solid catalyst component, comprising titanium magnesium and halogen, having a specific combination of physical and chemical characteristics. Furthermore, the present invention relates to a process for preparing ethylene homopolymers and copolymers characterized by a high melt flow ratio (F/P) value, which is the ratio between the melt index measured with a 21.6 Kg load (melt index F) and the melt index measured with a 5 Kg load (melt index P), determined at 190° C. according to ASTM D-1238. Said ratio F/P is generally considered as an indication of the breath of molecular weight distribution (MWD). The MWD is a particularly important characteristic for ethylene (co) polymers, in that it affects both the rheological behavior and therefore the processability of the melt, and the final mechanical properties. Polyolefins having a broad MWD, particularly coupled with relatively high average molecular weights, are preferred in blow molding and high speed extrusion processing for example for the production of pipes. In fact, products characterized by broad MWD have superior mechanical properties that enable their use in applications in which high stress resistance is required. The processing conditions for these polymers are peculiar and in fact under those conditions a narrow MWD product could not be processed because it would present failures due to melt fracture.

As it is difficult to have available catalysts offering the right pattern of molecular weight distribution and average molecular weight, one of the most common methods for preparing broad MWD polymers is the multi-step process based on the production of different molecular weight polymer fractions in each step, sequentially forming macromolecules with different length. The control of the molecular weight obtained in each step can be carried out according to different methods, for example by varying the polymerization conditions or the catalyst system in each step, or by using a molecular weight regulator. Regulation with hydrogen is the preferred method either working in suspension or in gas phase. This latter kind of process is nowadays highly preferred due to both the high qualities of the products obtained and to the low operative costs involved with it.

For a catalyst to perform in such a process, a critical step is that in which the low molecular weight fraction is prepared. In fact, one of important features that the catalyst should possess is the so called "hydrogen response", that is the extent of capability to reduce the molecular weight of polymer produced in respect of increasing hydrogen concentrations. Higher hydrogen response means that a lower amount of hydrogen is required to produce a polymer with a certain molecular weight. In turn, this would normally involve also higher polymerization activity because the amount of hydrogen, which has a depressive effect on the catalyst activity, can be relatively lower.

In addition, due to the polymerization conditions and characteristics of the polymer produced in this step (intrinsically higher fragility), the catalyst/polymer system is often fragmented in very small particles that lowers the polymer bulk density and creates high amount of fines that makes difficult the operation of the plant particularly in the gas-phase polymerization. One of the ways to obviate to this problem would be performing the step of preparing the low molecular weight fraction after a first step in which the high molecular weight fraction is prepared. While this option may help in smoothing the plant operability it surely causes worsening of the final property of the product which turns out to be less homogeneous. So, it would be another important feature of the catalyst that of having a suitable morphology resistance under low molecular weight gas-phase polymerization conditions.

In EP-A-601525 are disclosed catalysts that in some cases are able to give ethylene polymers with broad MWD (F/E ratios of 120 are reported, where F/E means the ratio between the melt index measured with a 21.6 Kg load (melt index F) and the melt index measured with a 2.16 Kg load (melt index E), determined at 190° C. according to ASTM D-1238.). Such catalysts are obtained by a reaction between a Ti compound and a $MgCl_2.EtOH$ adduct which has first been subject to physical dealcoholation and then to a chemical dealcoholation carried out with an aluminum alkyl compound. As a result, unless a preventive deactivation treatment of the Al-alkyl residues is carried out, a substantial amount of Ti compound fixed on the final catalyst component has an oxidation state lower than 4. When the preventive deactivation treatment is carried out the Ti fixed on the catalyst is much lower with a consequence that the said catalyst has a very high Cl/Ti molar ratio and more Al than titanium residue. The patent application reported good performances in terms of morphological resistance (expressed by the bulk density) under conventional slurry polymerization conditions which however are not predictive of the behaviour under low molecular weight polymerization conditions when a high amount of molecular weight regulator (hydrogen) is used. The applicant has indeed carried out the polymerization tests in those demanding conditions and proved that a substantial amount of catalyst broke down in the early polymerization stages giving rise to polymer fines and/or with irregular morphology thereby amounting to a very low final bulk density.

In WO00/78820 are disclosed catalysts able to give ethylene polymers with broad MWD characterized by a total porosity (mercury method) preferably in the range 0.38-0.9 $cm^3/g$, and a surface area (BET method) preferably in the range 30-70 $m^2/g$. The pore distribution is also specific; in particular, in all the catalysts described in the examples at least 45% of the porosity is due to pores with radius up to 0.1 μm. The catalyst components are obtained by (a) a first reaction between a Ti compound and a $MgCl_2.EtOH$ adduct which has been subject to physical dealcoholation, (b) an intermediate treatment with an aluminum alkyl compound and (c) by a second reaction with a titanium compound. Also in this case the catalysts contain a substantial amount of titanium having a reduced oxidation state and in addition show a rather low amount of residual Al in the final catalyst. Notwithstanding the good performances under conventional polymerization conditions, it shows an unsatisfactory behavior under the demanding test conditions used by the applicant. This is also confirmed in the said document by the fact that when broad MWD polyethylene is prepared with two sequential polymerization stages, the low molecular weight fraction is always prepared in the second polymerization stage.

It is therefore still felt the need of a catalyst having high morphological stability under the low molecular weight ethylene polymerization conditions while at the same time maintaining characteristics of high activity.

The applicant has surprisingly found that catalysts presenting the below combination of features are able to satisfy the needs. Accordingly, it is an object of the present invention a catalyst component comprising Ti, Mg, Al, Cl, and optionally $OR^I$ groups in which $R^I$ is a C1-C20 hydrocarbon group, optionally containing heteroatoms, up to an amount such as to give a molar $OR^I$/Ti ratio lower than 0.5, characterized by the fact that substantially all the titanium atoms are in valence state of 4, that the porosity ($P_F$), measured by the mercury method and due to pores with radius equal to or lower than 1 μm, is at least 0.30 cm$^3$/g, and by the fact that the Cl/Ti molar ratio is lower than 29.

Preferably, in the catalyst of the present invention the Cl/Ti molar ratio is lower than 28, more preferably lower than 25 and most preferably in the range 13-23. The Mg/Al molar ratio can range from 1 to 35, preferably from 3 to 30, more preferably from 4 to 20 and most preferably in the range 4-16. Throughout the present application the wording "substantially all the titanium atoms are in valence state of 4" means that at least 95% of the Ti atoms have a valence state of 4. Preferably, the content of Ti atoms with a valence state lower than 4 is less than 0.1% and more preferably they are absent (not detectable with the applied method described in the characterization section). The amount of Ti is typically higher than 1.5% preferably higher than 3% and more preferably equal to, or higher than, 3.2% wt. Most preferably it ranges from 3.5 to 8% wt. The amount of Al is typically higher than 0.5% wt., preferably higher than 1% and more preferably in the range of from 1.2-3.5%. Preferably, the amount of Al is lower than that of Ti.

The catalyst of the present invention shows also another peculiar feature. The amount of total anions that are detected, according to the methods described in the characterization section, on the solid catalyst component are usually not enough to satisfy the total of positive valences deriving from the cations including, but not limited to, Mg, Ti and Al even taking into account the possible presence of OR groups. In other words, it has been noticed that in the catalyst of the invention a certain amount of anions is often lacking in order to have all the valences of the cations satisfied. According to the present invention, this lacking amount is defined as "LA factor" where "LA factor" is the molar equivalent of anionic species lacking in order to satisfy all the molar equivalents of the cations present in the solid catalyst component which have not been satisfied by the total molar equivalent of the anions present in the solid catalyst component, all of the molar equivalents of anions and cations being referred to the Ti molar amount.

The "LA factor" is determined by first calculating the molar contents of all the anions and cations detected by the analysis. Then, the molar content relative to all of the anions (including but not limited to Cl$^-$ and $^-$OR and cations (including but not limited to Mg, Ti and Al) is referred to Ti by dividing it for the Ti molar amount which is therefore considered as the molar unity. Afterwards, the total number of molar equivalents of cations to be satisfied is calculated for example by multiplying the molar amount of Mg$^{++}$ (referred to Ti) by two, the molar amount of Ti$^{+4}$ (molar unity) by four, and the molar amount of Al$^{+3}$ by three respectively. The so obtained total value is then compared with the sum of the molar equivalents deriving from anions, for example Cl and OR groups, always referred to titanium. The difference resulting from this comparison, and in particular the negative balance obtained in terms of anion molar equivalents, indicates the "LA factor".

The "LA factor" is usually higher than 0.5, preferably higher than 1 and more preferably in the range from 1.5-6. Although examples departing from this trend are possible, it has been observed that in general the higher is the Al molar content and the higher is the "LA factor". It has also been found that the ratio "LA/Al+Ti", where Al is the molar amount of Al referred to Ti and Ti is the molar unity, is higher than 0.5, preferably higher than 0.7 and most preferably from 0.9 to 2. Without being construed as a limiting interpretation of the invention, it is possible that the LA factor is related to the formation of compounds in which two or more metal atoms are coupled by [—O—] bridges.

In addition to the above characteristics, the catalysts of the invention preferably show a porosity $P_F$ determined with the mercury method higher than 0.40 cm$^3$/g and more preferably higher than 0.50 cm$^3$/g usually in the range 0.50-0.80 cm$^3$/g. The total porosity $P_T$ can be in the range of 0.50-1.50 cm$^3$/g, particularly in the range of from 0.60 and 1.20 cm$^3$/g, and the difference ($P_T$-$P_F$) can be higher than 0.10 preferably in the range from 0.15-0.50.

The surface area measured by the BET method is preferably lower than 80 and in particular comprised between 10 and 70 m$^2$/g. The porosity measured by the BET method is generally comprised between 0.10 and 0.50, preferably from 0.10 to 0.40 cm$^3$/g.

In a preferred aspect the catalyst component of the invention comprises a Ti compound having at least one Ti-halogen bond, a magnesium chloride and an aluminum chloride, or more generally, an aluminum halide. As mentioned before, the catalyst component may also contain groups different from halogen, in any case in amounts lower than 0.5 mole for each mole of titanium and preferably lower than 0.3. Throughout the present application the term magnesium chloride means a magnesium compound having at least a Mg—Cl bond, the term aluminum chloride means an aluminum compound containing at least an Al—Cl bond and the term aluminum halide means an aluminum compound containing at least an Al—X bond, where X is Cl, Br or I.

In the catalyst component of the invention the average pore radius value, for porosity due to pores up to 1 μm, is in the range from 650 to 1200 Å.

The particles of solid component have substantially spherical morphology and average diameter comprised between 5 and 150 μm, preferably from 20 to 100 μm and more preferably from 30 to 90 μm. As particles having substantially spherical morphology, those are meant wherein the ratio between the greater axis and the smaller axis is equal to or lower than 1.5 and preferably lower than 1.3.

The magnesium chloride is preferably magnesium dichloride and is more preferably in the active form meaning that it is characterized by X-ray spectra in which the most intense diffraction line which appears in the spectrum of the non active chloride (lattice distanced of 2,56 Å) is diminished in intensity and is broadened to such an extent that it becomes totally or partially merged with the reflection line falling at lattice distance (d) of 2.95 Å. When the merging is complete the single broad peak generated has the maximum of intensity which is shifted towards angles lower than those of the most intense line.

The components of the invention can also comprise an electron donor compound (internal donor), selected for example among ethers, esters, amines and ketones. Said compound is necessary when the component is used in the stereoregular (co)polymerization of olefins such as propylene, 1-butene, 4-methyl-pentene-1. In particular, the internal electron donor compound can be selected from the alkyl, cycloalkyl and aryl ether and esters of polycarboxylic acids, such as for example esters of phthalic and maleic acid, in particular n-butylphthalate, diisobutylphthalate, di-n-octylphthalate.

Other electron donor compounds advantageously used are the 1,3-diethers disclosed particularly in EP 361494, EP361493, and EP728769.

If present, the electron donor compound is in molar ratio with respect to the magnesium comprised between 1:4 and 1:20.

The preferred titanium compounds have the formula $Ti(OR^I)_nX_{y-n}$, wherein n is a number comprised between 0 and 0.5 inclusive, y is the valence of titanium, $R^I$ has the meaning given above and preferably is an alkyl, cycloalkyl or aryl radical having 1-8 carbon atoms and X is halogen. In particular $R^I$ can be methyl, ethyl, iso-propyl, n-butyl, isobutyl, 2-ethylhexyl, n-octyl and phenyl; X is preferably chlorine.

The aluminum halide can be chosen among those of formula $AlXL_2$ where X is haolen as previously defined and L can be, independently, $OR^I$ groups as defined above or halogen. Preferably the aluminum halide is an aluminum chloride of formula $AlClL_2$ where L can be, independently, $OR^I$ groups as defined above or chlorine. Preferably, L is chlorine. However, as mentioned above it is also possible the presence of cyclic species containing the repeating unit of formula $-[ML_{v-2}O-]_p-$ in which M is independently Al or Ti, v is the valence of M, p is at least 2 and L has the meaning set forth above and preferably chlorine, and the presence of linear species of formula $ML_{v-1}-O-[ML_{v-2}O-]_n-ML_{v-1}$ in which M, L and v have the meaning set forth above and n is from 0 to 10. Preferably, in the latter formula M is Al and L is Cl. Species of formula $ROAlCl-[AlClO-]AlCl_2$ are also preferred.

The catalyst of the invention can be prepared according to several methods. One of the preferred methods comprises a step (a) in which a compound $MgCl_2.mR^{II}OH$ $tH_2O$, wherein $0.3 \leq m \leq 1.7$, t is from 0.01 to 0.6, and $R^{II}$ is an alkyl, cycloalkyl or aryl radical having 1-12 carbon atoms is reacted with a titanium compound of the formula $Ti(OR^I)_nX_{y-n}$, in which n is comprised between 0 and 0.5, y is the valence of titanium, X is halogen and $R^I$ has the meaning given above, and preferably is an alkyl radical having 1-8 carbon atoms, in the presence of an aluminum compound of formula $AlL_3$ where L can be, independently, $OR^I$ groups as defined above or halogen. Preferably, at least one L is chlorine, more preferably two L are chlorine and most preferably all L are chlorine.

In this case $MgCl_2.mR^{II}OHtH_2O$ represents a precursor of Mg dihalide. These kind of compounds can generally be obtained by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Representative methods for the preparation of these spherical adducts are reported for example in U.S. Pat. No. 4,469,648, U.S. Pat. No. 4,399,054, and WO98/44009. Another useable method for the spherulization is the spray cooling described for example in U.S. Pat. Nos. 5,100,849 and 4,829,034. Adducts having the desired final alcohol content can be obtained by directly using the selected amount of alcohol directly during the adduct preparation. However, if adducts with increased porosity are to be obtained it is convenient to first prepare adducts with more than 1.7 moles of alcohol per mole of $MgCl_2$ and then subjecting them to a thermal and/or chemical dealcoholation process. The thermal dealcoholation process is carried out in nitrogen flow at temperatures comprised between 50 and 150° C. until the alcohol content is reduced to the value ranging from 0.3 to 1.7. A process of this type is described in EP 395083.

Generally these dealcoholated adducts are also characterized by a porosity (measured by mercury method) due to pores with radius up to 0.1 μm ranging from 0.15 to 2.5 cm³/g preferably from 0.25 to 1.5 cm³/g.

In the reaction of step (a) the molar ratio Ti/Mg is stoichiometric or higher; preferably this ratio in higher than 3. Still more preferably a large excess of titanium compound is used. Preferred titanium compounds are titanium tetrahalides, in particular $TiCl_4$. The reaction with the Ti compound can be carried out by suspending the adduct in cold $TiCl_4$ (generally 0° C.); the mixture is heated up to 80-140° C. and kept at this temperature for 0.5-5 hours. Preferably reaction times in the higher end of the range are suitable in correspondence of reaction temperature in the lower end of the range. The excess of titanium compound can be separated at high temperatures by filtration or sedimentation and siphoning. As mentioned above the reaction is carried out in the presence of the aluminum compound mentioned above, preferably $AlCl_3$, which is used in amounts such as to have Mg/Al molar ratio can range from 1 to 35, preferably from 3 to 30, more preferably from 4 to 20 and most preferably in the range 4-16. The catalyst component recovered and washed according to conventional techniques is already able to show the good performances disclosed above. However, it has been found that still improved performances can be obtained when in a second step (b) of the method, the solid product coming from step (a) is subject to a thermal treatment carried out at temperatures higher than 50° C., preferably higher than 70° C., more preferably higher than 100° C., especially higher than 120° C. and most preferably higher than 130° C. Temperatures in the lower end of the range are particularly preferred when $AlCl_2OR$ compounds are used in which R is a branched alkyl group.

The thermal treatment can be carried out in several ways. According to one of them the solid coming from step (a) is suspended in an inert diluent like a hydrocarbon and then subject to the heating while maintaining the system under stirring.

According to an alternative technique the solid can be heated in a dry state by inserting it in a device having jacketed heated walls. While stirring can be provided by means of mechanical stirrers placed within said device it is preferred to cause stirring to take place by using rotating devices.

According to a still different embodiment the solid coming from (a) can be heated by subjecting it to a flow of hot inert gas such as nitrogen, preferably maintaining the solid under fluidization conditions.

According to an additional embodiment, the heating is provided via a further reaction with an excess the titanium compound carried out at the mentioned high temperatures.

The heating time is not fixed but may vary depending also on the other conditions such as the maximum temperature reached. It generally ranges from 0.1 to 10 hours more specifically from 0.5 to 6 hours. Usually, higher temperatures allow the heating time to be shorter while, on the opposite, lower temperatures may require longer reaction times.

According to another embodiment the catalyst of the invention can be prepared by a first step (a) in which a compound $MgCl_2 \cdot mR^{II}OH \ tH_2O$, wherein $0.3 \leq m \leq 1.7$, t is from 0.01 to 0.6, and $R^{II}$ is an alkyl, cycloalkyl or aryl radical having 1-12 carbon atoms is reacted with a titanium compound of the formula $Ti(OR^I)_n X_{y-n}$, in which n is comprised between 0 and 0.5, y is the valence of titanium, X is halogen and $R^I$ has the same meaning given above, and a second step (b) in which the solid product coming from (a) is reacted again with the said titanium compound in the presence of an aluminum compound of formula $AlL_3$ where L can be, independently, $OR^I$ groups as defined above or halogen or chlorine, preferably $AlClL_2$.

If desired after this step (b) the solid product can be subject to a heat treatment according to anyone of the process and conditions described above.

Finally, according to a still different method the solid catalyst components are obtained by a method comprising a step (a) in which a compound $MgCl_2 \cdot mR^{II}OH \ tH_2O$, wherein $0.3 \leq m \leq 1.7$, t is from 0.01 to 0.6, and $R^{II}$ is an alkyl, cycloalkyl or aryl radical having 1-12 carbon atoms is reacted with a titanium compound of the formula $Ti(OR^I)_n X_{y-n}$, in which n is comprised between 0 and 0.5, y is the valence of titanium, X is halogen and $R^I$ has the meaning given above; and a second step (b) in which the solid product coming from (a) is subject to a heat treatment in the presence of an aluminum compound of formula $AlL_3$ where L can be, independently, $OR^I$ groups as defined above or halogen. Preferably at least one L is chlorine according to the formula preferably $AlClL_2$. Said heat treatment is to be carried out according to anyone of the process and conditions described above.

Whatever it is the method used to prepare the solid catalyst component of the invention, it has been found advantageous to carry out a final treatment of the catalyst comprising contacting the said solid catalyst component with an electron donor compound preferably chosen among ethers, ketones, esters and silicon compounds. Preferably, said electron donor compound is chosen among diethers and diketones and more preferably among 1,3 diethers.

Preferred diethers are 9,9 dimethoxy fluorene and the 1,3 diethers mentioned EP 728769 among which 9,9-bis(methoxymethyl)fluorene is preferred. Among diketones, aliphatic diketones are preferred and among them acetylacetone being the most preferred. The contact is preferably carried out in an inert hydrocarbon as diluent at a temperature ranging from room temperature to the boiling temperature of the donor, generally from 40 to 150° C. and preferably from 50° C. to 140° C. The electron donor compound can be used in molar ratio with the Ti compound in the solid catalyst component coming from step (b) ranging from 5 to 0.01, preferably from 1 to 0.1 and more preferably from 0.8 to 0.1. The donor becomes fixed on the catalyst component in variable amounts which do not seem correlated with the effect on the morphological stability i.e., with the capability of the catalyst of producing high bulk density polymers even under demanding test conditions used by the applicant. In fact, the positive effect on the morphological stability is always present even when the amount of fixed donor is very low or, possibly absent. In particular, the treatment with the donor allow the catalyst to have an even more increased morphological stability evidenced by the fact that polymer with high bulk density are obtainable also by polymerizing ethylene in the presence of a high amount of hydrogen and by using triethylaluminum as cocatalyst which are known as extremely demanding conditions.

The catalyst components of the invention whatever is the method for their preparation, form catalysts, for the polymerization of alpha-olefins $CH_2=CHR^{III}$ wherein $R^{III}$ is hydrogen or a hydrocarbon radical having 1-12 carbon atoms by reaction with Al-alkyl compounds. In particular Al-trialkyl compounds, for example Al-trimethyl, Al-triethyl, Al-tri-n-butyl, Al-triisobutyl are preferred. The Al/Ti ratio is higher than 1 and is generally comprised between 5 and 800.

In case of the stereoregular polymerization of α-olefins such as for example propylene and 1-butene, an electron donor compound (external donor) which can be the same or different from the compound used as internal donor is also generally used in the preparation of the catalyst.

When the internal donor is an ester of a polycarboxylic acid, in particular a phthalate, the external donor is preferably selected from the silane compounds containing at least a Si—OR link, having the formula $R^{IX}_{4-n}Si(OR^X)_n$, wherein $R^{IX}$ is an alkyl, cycloalkyl, aryl radical having 1-18 carbon atoms, $R^X$ is an alkyl radical having 1-4 carbon atoms and n is a number comprised between 1 and 3. Examples of these silanes are methyl-cyclohexyl-dimethoxysilane, diphenyl-dimethoxysilane, methyl-t-butyl-dimethoxysilane, dicyclopentyldimethoxysilane.

It is possible to advantageously use also the 1,3 diethers having the previously described formula. In the case in which the internal donor is one of these diethers, the use of an external donor can be avoided, as the stereospecificity of the catalyst is already sufficiently high.

The spherical components of the invention and catalysts obtained therefrom find applications in the processes for the preparation of several types of olefin polymers.

As mentioned above, the catalyst of the invention are endowed with a particularly high morphological stability under high hydrogen concentration for the preparation of low molecular ethylene (co)polymer. Thus, they are particularly suitable use in cascade, or sequential polymerization processes, for the preparation of broad molecular weight ethylene polymers both in slurry and gas-phase. In general the catalyst can be used to prepare: high density ethylene polymers (HDPE, having a density higher than 0.940 g/cm³), comprising ethylene homopolymers and copolymers of ethylene with alpha-olefins having 3-12 carbon atoms; linear low density polyethylene's (LLDPE, having a density lower than 0.940 g/cm³) and very low density and ultra low density (VLDPE and ULDPE, having a density lower than 0.920 g/cm³, to 0.880 g/cm³ cc) consisting of copolymers of ethylene with one or more alpha-olefins having from 3 to 12 carbon atoms, having a mole content of units derived from the ethylene higher than 80%; elastomeric copolymers of ethylene and propylene and elastomeric terpolymers of ethylene and propylene with smaller proportions of a diene having a content by weight of units derived from the ethylene comprised between about 30 and 70%, isotactic polypropylenes and crystalline copolymers of propylene and ethylene and/or other alpha-olefins having a content of units derived from propylene higher than 85% by weight; shock resistant polymers of propylene obtained by sequential polymerization of propylene and mixtures of propylene with ethylene, containing up to 30% by weight of ethylene; copolymers of propylene and 1-butene having a number of units derived from 1-butene comprised between 10 and 40% by weight.

However, as previously indicated they are particularly suited for the preparation of broad MWD polymers and in particular of broad MWD ethylene homopolymers and copolymers containing up to 20% by moles of higher α-olefins such as propylene, 1-butene, 1-hexene, 1-octene.

One additional advantage of the catalyst described in the present application is that it can be used as such in the polymerization process by introducing it directly into the reactor without the need of pre-polymerizing it. This allows simplification of the plant set-up and simpler catalyst preparation process.

The main polymerization process in the presence of catalysts obtained from the catalytic components of the invention can be carried out according to known techniques either in liquid or gas phase using for example the known technique of the fluidized bed or under conditions wherein the polymer is mechanically stirred. However, the preferred process is carried out in the gas phase fluidized bed reactor. Whatever is the process involved, the catalyst described above in view of their good morphological particles stability can withstand to polymerization temperatures higher than the standard ones, that is higher than 80° C. and in particular in the range 85-100° C. As higher polymerization temperatures allow to simultaneously get higher yields and a more efficient heat removal due to the higher difference between polymerization temperature and the refrigerating fluid, it results that with the catalyst of the invention the productivity of the polymerization plant is greatly enhanced.

Examples of gas-phase processes wherein it is possible to use the spherical components of the invention are described in WO92/21706, U.S. Pat. No. 5,733,987 and WO93/03078. In this processes a pre-contacting step of the catalyst components, a pre-polymerization step and a gas phase polymerization step in one or more reactors in a series of fluidized or mechanically stirred bed are comprised even if as mentioned above, they are not strictly required with the catalyst of the invention.

Therefore, in the case that the polymerization takes place in gas-phase, the process of the invention is preferably carried out according to the following steps:

(a) contacting the catalyst components in the absence of polymerizable olefin or optionally in the presence of said olefin in amounts not greater than 20 g per gram of the solid component (A);

(b) gas-phase polymerization of ethylene or mixtures thereof with α-olefins $CH_2=CHR$, in which R is a hydrocarbon radical having 1-10 carbon atoms, in one or more fluidized or mechanically stirred bed reactors using the catalyst system coming from (a).

As mentioned above, in order to further broaden the MWD of the product, the process of the invention can be performed in two or more reactors working under different conditions and optionally by recycling, at least partially, the polymer which is formed in the second reactor to the first reactor. Usually, the two or more reactors work with different concentrations of molecular weight regulator or at different polymerization temperatures or both. Preferably, the polymerization is carried out in two or more steps operating with different concentrations of molecular weight regulator.

As already explained, one of the most interesting feature of the above described catalysts is the capability to produce ethylene polymers with low molecular weight, expressed by high melt index "E" value and good morphological properties expressed by high values of bulk density. In particular, the said ethylene polymers have Melt Index E higher than 50 and bulk densities higher than 0.35. Particularly preferred are those having MI"E" higher than 70 and bulk density higher than 0.37 and most preferred are those with MI"E" in the range 80-400 and bulk density in the range 0.4-0.6. When these kind of polymers are produced in the low molecular weight polymerization step of a multi-step process, they allow obtaining ethylene polymers having at the same time broad MWD usually expressed by a melt flow ratio (F/P) value over 20, preferably over 25 and more preferably over 35, which is the ratio between the melt index measured with a 21.6 Kg load (melt index F) and the melt index measured with a 5 Kg load (melt index P), determined at 190° C. according to ASTM D-1238, bulk density over 0.44, preferably over 0.46 and preferably good homogeneity expressed by a number of gels (determined by the method set forth below) having diameter of higher than 0.2 mm of lower than 70 and preferably lower than 60. Moreover, preferably the films contain no gels with diameter higher than 0.5 mm Once used in the production of films or pipes indeed, the polymers showed a very good processability while the extruded articles showed a very low number of gels. The polymer is obtained in form of spherical particles meaning that the ratio between the greater axis and the smaller axis is equal to, or lower than, 1.5 and preferably lower than 1.3.

The following examples are given in order to further describe and not to limit the present invention.

The properties are determined according to the following methods:

Porosity and surface area with nitrogen: are determined according to the B.E.T. method (apparatus used SORPTOMATIC 1900 by Carlo Erba).

Porosity and surface area with mercury:

The measure is carried out using a "Porosimeter 2000 series" by Carlo Erba.

The porosity is determined by absorption of mercury under pressure. For this determination use is made of a calibrated dilatometer (diameter 3 mm) $CD_3$ (Carlo Erba) connected to a reservoir of mercury and to a high-vacuum pump ($1 \cdot 10^{-2}$ mbar). A weighed amount of sample is placed in the dilatometer. The apparatus is then placed under high vacuum (<0.1 mm Hg) and is maintained in these conditions for 20 minutes. The dilatometer is then connected to the mercury reservoir and the mercury is allowed to flow slowly into it until it reaches the level marked on the dilatometer at a height of 10 cm. The valve that connects the dilatometer to the vacuum pump is closed and then the mercury pressure is gradually increased with nitrogen up to 140 kg/cm². Under the effect of the pressure, the mercury enters the pores and the level goes down according to the porosity of the material.

The porosity (cm³/g), both total and that due to pores up to 1 μm, the pore distribution curve, and the average pore size are directly calculated from the integral pore distribution curve which is function of the volume reduction of the mercury and applied pressure values (all these data are provided and elaborated by the porosimeter associated computer which is equipped with a "MILESTONE 200/2.04" program by C. Erba.

MIE flow index: ASTM-D 1238 condition E
MIF flow index: ASTM-D 1238 condition F
MIP flow index: ASTM D 1238 condition P
Bulk density: DM-53194
Determination of $Ti^{(red)}$ 0.5 g of the sample in powder form, are dissolved in 100 ml of HCl 2.7M in the presence of solid $CO_2$. The so obtained solution is then subject to a volumetric titration with a solution of $FeNH_4(SO_4)_2 \cdot 12H_2O$ 0.1N, in the presence of solid $CO_2$, using as indicator of the equivalence point $NH_4SCN$ (25% water solution). The stoichiometric calculations based on the volume of the titration agent consumed give the weight amount of $Ti^{3+}$ in the sample.

Determination of Mg, $Ti_{(tot)}$ and Al: has been carried out via inductively coupled plasma emission spectroscopy (ICP) on a "I.C.P SPECTROMETER ARL Accuris".

The sample was prepared by analytically weighting, in a "fluxy" platinum crucible", 0.1÷03 g of catalyst and 3 gr of lithium metaborate/tetraborate 1/1 mixture. The crucible is placed on a weak Bunsen flame for the burning step and then after addition of some drops of KI solution inserted in a special apparatus "Claisse Fluxy" for the complete burning. The residue is collected with a 5% v/v $HNO_3$ solution and then analyzed via ICP at the following wavelength: Magnesium, 279.08 nm; Titanium, 368.52 nm; Aluminum, 394.40 nm.

Determination of Cl: has been carried out via potentiometric tritration.

Determination of OR groups: via Gas-Chromatography analysis

Determination of gel number: 45 Kg of polymer are addictivated with Irgafox 168 (0.15 wt %), ZnO (0.15 wt. %), Zinc Stearate (0.05 wt. %), PPA-VITOW Z100 (0.03 wt. %) and are pelletized by a twin screw extruder WP (Werner & Pfliderer) ZSK 40 plus Gear pump plus underwater pelletizer, keeping the temperature at 230° C. in all the sections at 38 Kg/h output. The product is then extruded into blown film, by using a grooved feed based extruder Dolci KRC 40, with barrel temperature profile of 220-225-225-220° C. and 230-230° C. at die zones. Output is 28 Kg/h at 50 rpm. Film is extruded with blow up ratio (BUR) of 4:1, and neck length of 7.5:1 at 20 micron thickness. The determination of the number of gels per $m^2$ is carried out by visually detecting the number of gels having size of the longer axis higher than 0.2 mm on a piece of the extruded film (25×7.5 cm size) which is projected by a projector, on the wall-chart with a magnificated scale. The counting is made on 5 different pieces of the same film and a final number is given by the expression No=A/S where No is the number of gels per $m^2$, A is the number of gels counted on 5 film pieces and S is the overall surface in $m^2$ of the 5 films pieces examined.

Ethylene Polymerization: General Procedure A.

A 4.5 liter stainless-steel autoclave equipped with a magnetic stirrer, temperature and pressure indicator, feeding line for hexane, ethylene, and hydrogen, was used and purified by fluxing pure nitrogen at 70° C. for 60 minutes. Then, a solution of 1550 $cm^3$ of hexane containing 7.7 $cm^3$ of 10% by wt/vol TiBAL/hexane was introduced at a temperature of 30° C. under nitrogen flow. In a separate 200 cm3 round bottom glass bottle were successively introduced, 50 cm3 of anhydrous hexane, 1 cm3 of 10% by wt/vol, TiBAL/hexane solution and 0.040÷0.070 g of the solid catalyst of table 1. They were mixed together, aged 10 minutes at room temperature and introduced under nitrogen flow into the reactor. The autoclave was closed, then the temperature was raised to 85° C., hydrogen (9 bars partial pressure) and ethylene (3.0 bars partial pressure) were added.

Under continuous stirring, the total pressure was maintained at 85° C. for 120 minutes by feeding ethylene. At the end the reactor was depressurized and the temperature was dropped to 30° C. The recovered polymer was dried at 70° C. under a nitrogen flow and analyzed. The obtained results are reported in table 2.

General Ethylene Polymerization Procedure (Procedure B)

The procedure is carried out under the same conditions disclosed for the procedure (A) with the only difference that triethylaluminum is used instead of triisobutylaluminum.

EXAMPLES

Preparation of the Spherical Support (Adduct $MgCl_2$/EtOH)

A magnesium chloride and alcohol adduct was prepared following the method described in example 2 of U.S. Pat. No. 4,399,054, but working at 2000 RPM instead of 10000 RPM. The adduct containing about 3 mols of alcohol and 3.1% wt of $H_2O$ and had an average size of about 70 µm. The adduct were subject to a thermal treatment, under nitrogen stream, over a temperature range of 50-150° C. until a weight content of 25% of alcohol was reached.

Example 1

Preparation of the Solid Component

Into a 450 mL four-necked round flask, purged with nitrogen, 300 mL of $TiCl_4$ and 1.34 g of anhydrous $AlCl_3$ were introduced at 25° C. and cooled at 0° C. Then, at the same temperature, 20.9 g of a spherical $MgCl_2$/EtOH adduct containing 25% wt of ethanol and prepared as described above were added under stirring. The temperature was raised to 135° C. in 100 minutes and maintained for 120 min. Then, the temperature was decreased to 130° C., stirring was discontinued, the solid product was allowed to settle for 30 min. and the supernatant liquid was siphoned off. The solid residue was then washed five times with hexane at 60° C., once at room temperature and then dried under vacuum at 30° C.

Into a 250 $cm^3$ four-necked round flask, purged with nitrogen, 120 $cm^3$ of Isopar-L and 12.0 g of the solid component previously prepared, were introduced at 25° C. Under stirring, the temperature was raised to 130° C. in 45 minutes and maintained for 5 hour. Then, the temperature was decreased to 80° C., the stirring was discontinued, the solid product was allowed to settle for 30 minutes and the supernatant liquid was siphoned off. The solid was washed twice with 100 $cm^3$ each of anhydrous hexane at 25° C. Finally, the solid was dried under vacuum and analyzed. The results are reported in table 1.

Example 2 a) Into a 1 L four-necked round flask, purged with nitrogen, 715 mL of $TiCl_4$ and 6.30 g of anhydrous $AlCl_3$ were introduced at 25° C. and cooled at 0° C. Then, at the same temperature, 56.5 g of a spherical $MgCl_2$/EtOH adduct containing 25% wt of ethanol and prepared as described above were added under stirring. The temperature was raised to 135° C. in 120 minutes and maintained for 120 min. Then, the temperature was decreased to 130° C., stirring was discontinued, the solid product was allowed to settle for 30 min. and the supernatant liquid was siphoned off. The solid residue was then washed five times with hexane at 60° C., once at room temperature and then dried under vacuum at 30° C.

b) Into a 300 $cm^3$ four-necked round flask, purged with nitrogen, 100 $cm^3$ of anhydrous heptane and 10.9 g of the solid component previously prepared, were introduced at 25° C. Under stirring, the temperature was raised to 98° C. in 20 minutes and maintained for 3 hour. Then, the temperature was decreased to 90° C., the stirring was discontinued, the solid product was allowed to settle for 30 minutes and the supernatant liquid was siphoned off. The solid was washed once with 100 $cm^3$ of anhydrous hexane at 25° C. and finally was dried under vacuum and analyzed. The results are reported in table 1.

Example 3

Into a 250 $cm^3$ four-necked round flask, purged with nitrogen, 92 $cm^3$ of anhydrous heptane and 9.2 g of the solid component of Example 2a), were introduced at 25° C. Under stirring, the temperature was raised to 90° C. in 20 minutes and maintained for 5 hour. Then, the stirring was discontinued, the solid product was allowed to settle for 30 minutes and the supernatant liquid was siphoned off. The solid was washed once with 100 cm$^3$ each of anhydrous hexane at 25° C. and finally was dried under vacuum and analyzed. The results are reported in table 1.

Example 4

Into a 450 mL four-necked round flask, purged with nitrogen, 310 mL of TiCl$_4$ and 2.35 g of anhydrous AlCl$_3$ were introduced at 25° C. and cooled at 0° C. Then, at the same temperature, 21.7 g of a spherical MgCl$_2$/EtOH adduct containing 25% wt of ethanol and prepared as described above were added under stirring. The temperature was raised to 135° C. in 100 minutes and maintained for 120 min. Then, the temperature was decreased to 130° C., stirring was discontinued, the solid product was allowed to settle for 30 min. and the supernatant liquid was siphoned off. The solid residue was then washed five times with hexane at 60° C., once at room temperature and then dried under vacuum at 30° C.

Into a 250 cm$^3$ four-necked round flask, purged with nitrogen, 135 cm$^3$ of Isopar-L and 13.5 g of the solid component previously prepared, were introduced at 25° C. Under stirring, the temperature was raised to 170° C. in 45 minutes and maintained for 1 hour. Then, the temperature was decreased to 80° C., the stirring was discontinued, the solid product was allowed to settle for 30 minutes and the supernatant liquid was siphoned off. The solid was washed twice with 100 cm$^3$ each of anhydrous hexane at 25° C. and finally was dried under vacuum and analyzed. The results are reported in table 1.

Example 5 a) Into a 1.5 L four-necked glass reactor, purged with nitrogen, 950 mL of TiCl$_4$ and 7.07 g of anhydrous AlCl$_3$ were introduced at 25° C. and cooled at 0° C. Then, at the same temperature, 66.8 g of a spherical MgCl$_2$/EtOH adduct containing 25% wt of ethanol and prepared as described above were added under stirring. The temperature was raised to 135° C. in 100 minutes and maintained for 120 min. Then, the temperature was decreased to 130° C., stirring was discontinued, the solid product was allowed to settle for 30 min. and the supernatant liquid was siphoned off. The solid residue was then washed five times with hexane at 60° C., once at room temperature and then dried under vacuum at 30° C.
b) Into a 200 cm$^3$ four-necked round flask, purged with nitrogen, 110 cm$^3$ of anhydrous isopar-L and 11.1 g of the solid component a) previously prepared, were introduced at 25° C. Under stirring, the temperature was raised to 130° C. in 30 minutes and maintained for 5 hour. Then, the temperature was decreased to 80° C., the stirring was discontinued, the solid product was allowed to settle for 30 minutes and the supernatant liquid was siphoned off. The solid was washed three times with 100 cm$^3$ each of anhydrous hexane at 25° C. and finally was dried under vacuum and analyzed. The results are reported in table 1.

Example 6 a) Into a 1.5 L four-necked glass reactor, purged with nitrogen, 1 L of TiCl$_4$ was introduced at 25° C. and cooled at 0° C. Then, at the same temperature, 12.5 g of anhydrous AlCl$_3$ and 100 g of a spherical MgCl$_2$/EtOH adduct containing 25% wt of ethanol and prepared as described above were added under stirring. The temperature was raised to 135° C. in 120 minutes and maintained for 120 min. Then, the temperature was decreased to 130° C., stirring was discontinued, the solid product was allowed to settle for 60 min. and the supernatant liquid was siphoned off. The solid residue was then washed seven times with hexane at 60° C. and then dried under vacuum at 30° C.
b) The solid product so obtained was introduced into a 1000 cm$^3$ four-necked round flask, purged with nitrogen and connected to a "rotavapoor" system maintained under nitrogen atmosphere. The temperature of the oil-bath was set to 145° C. and the rotation speed of the rotavapor was set to 70 rpm. Then maintaining the flask in rotation it was immersed into the oil-bath. In about 20 minutes the internal temperature was raised to 140° C. and maintained for 2 hours. At the end, the temperature was decreased to 25° C. and the solid analyzed. The results are reported in table 1.

Example 7

Into a 1.5 L four-necked glass reactor, purged with nitrogen, 1 L of TiCl$_4$ was introduced at 25° C. and cooled at 0° C. Then, at the same temperature, 100 g of a spherical MgCl$_2$/EtOH adduct containing 25% wt of ethanol and prepared as described above were added under stirring. The temperature was raised to 130° C. in 90 minutes and then decreased to 80° C. Maintaining the temperature at 80° C., 12.5 g of anhydrous AlCl$_3$ were added under stirring. The temperature was again increased to 135° C. in 40 minutes and maintained under continuous stirring for 5 hours. Then the temperature was decreased to 90° C., stirring was discontinued, the solid product was allowed to settle for 30 min. and the supernatant liquid was siphoned off. The solid residue was then washed seven times with hexane at 60° C., then dried under vacuum at 30° C. and analyzed. The results are reported in table 1.

Example 8

Into a 500 cm$^3$ four-necked glass reactor, purged with nitrogen, 300 cm$^3$ of TiCl$_4$ was introduced at 25° C. and cooled at 0° C. At the same temperature, 2.6 g of anhydrous AlCl$_3$ and 20.8 g of a spherical MgCl$_2$/EtOH adduct containing 25% wt of ethanol and prepared as described above were added under stirring. The temperature was raised to 135° C. in 110 minutes and maintained under continuous stirring for 2 hours. Then the temperature was decreased to 130° C., stirring was discontinued, the solid product was allowed to settle for 30 min, the supernatant liquid was siphoned off and the solid residue was washed four times with heptane at 90° C. At the end, 200 cm$^3$ of heptane were introduced, the temperature was increased to 97° C. and maintained for 5 hours under continuous stirring. Then, stirring was discontinued, the solid product was allowed to settle for 30 min. and the supernatant liquid was siphoned off. The solid residue was washed four times with hexane at 60° C. and then dried under vacuum at 30° C. and analyzed. The results are reported in table 1.

Example 9 a) Into a 2 L four-necked round flask, purged with nitrogen, 1 L of TiCl$_4$ was introduced at 0° C. Then, at the same temperature, 70 g of a spherical MgCl$_2$/EtOH adduct containing 25% wt of ethanol and prepared as described above were added under stirring. The temperature was raised to 140° C. in 2 h and maintained for 60 min. Then, the stirring was discontinued, the solid product was allowed to settle and the supernatant liquid was siphoned off. The solid residue was then washed once with heptane at 80° C. and five times with hexane at 25° C. and dried under vacuum at 30° C.

b) Into a 350 cm³ four-necked round flask, purged with nitrogen, 220 cm³ of $TiCl_4$ and 2.29 g of anhydrous $AlCl_3$ were introduced at 25° C. and cooled at 0° C. Then, at the same temperature, 21.5 g of the solid component a) previously prepared were added under stirring. The temperature was raised to 135° C. in 45 minutes and maintained for 5 hour. Then, the temperature was decreased to 80° C., the stirring was discontinued, the solid product was allowed to settle for 30 minutes and the supernatant liquid was siphoned off. The solid was washed five times with hexane at 60° C. and once at 25° C. Finally, the solid was dried under vacuum and analyzed. The results are reported in table 1.

Example 10

Into a 200 cm³ four-necked round flask, purged with nitrogen, 75 cm³ of anhydrous isopar-L, 1.9 g of anhydrous $AlCl_3$ and 15.0 g of the solid component of example 9a) previously prepared, were introduced at 25° C. Under stirring, the temperature was raised to 150° C. in 30 minutes and maintained for 1 hour. Then, the solid product was allowed to settle for 30 minutes and the supernatant liquid was siphoned off. The solid was washed with 100 cm³ of heptane at 90° C. and three times with anhydrous hexane at 25° C., finally was dried under vacuum and analyzed. The results are reported in table 1.

Example 11 a) Into a 1.5 L four-necked glass reactor, purged with nitrogen, 1 L of $TiCl_4$ was introduced at 25° C. and cooled at 0° C. Then, at the same temperature, 10.9 g of anhydrous $AlCl_3$ and 100 g of a spherical $MgCl_2$/EtOH adduct containing 25% wt of ethanol and prepared as described above were added under stirring. The temperature was raised to 135° C. in 120 minutes and maintained for 120 min. Then, the temperature was decreased to 130° C., stirring was discontinued, the solid product was allowed to settle for 60 min. and the supernatant liquid was siphoned off. The solid residue was then washed seven times with hexane at 60° C. and then dried under vacuum at 30° C.

b) 10 g of the solid product so obtained and 100 ml of hexane were introduced at room temperature into a 250 cm³ four-necked glass autoclave, purged with nitrogen. The autoclave is then closed, and the internal temperature was rised to 100° C. and maintained for 5.5 hours. At the end, the temperature was decreased to 55° C., the stirring was discontinued, the solid product was allowed to settle for 10 minutes and the supernatant liquid was siphoned off. The solid was washed with hexane at 25° C., then dried under vacuum at 30° C. and analyzed. The results are reported in table 1.

Example 12

Into a 200 cm³ four-necked round flask, purged with nitrogen, 75 cm³ of anhydrous heptane, 17.2 ml of an heptane solution containing 14.2 mmol of anhydrous $AlCl_2OiPr$ and 15.2 g of the solid component of example 9a) previously prepared, were introduced at 25° C. Under stirring, the temperature was raised to 80° C. in 20 minutes and maintained for 3 hour. Then, the solid product was allowed to settle for 30 minutes and the supernatant liquid was siphoned off. The solid was washed with 100 cm³ of heptane at 80° C. and three times with anhydrous hexane at 25° C., finally was dried under vacuum and analyzed. The results are reported in table 1.

Example 13

The catalyst component was prepared according to the same procedure disclosed in example 7 with the difference that $AlI_3$ was used in moar ratio Mg/Al 7.3 instead of $AlCl_3$. The characterization results are reported in table 1.

Example 14

In a 500 mL four-necked round flask equipped with a mechanical stirrer and purged with nitrogen, 200 mL of anhydrous heptane and 2 g of the solid catalyst component obtained as disclosed in example 7 were charged at room temperature. At the same temperature, under stirring an amount of acetylacetone to achieve a molar ED/Ti ratio of 0.5 was added dropwise. The temperature was raised to 50° C. and the mixture was stirred for 3 hours. Then, the stirring was discontinued, the solid product was allowed to settle and the supernatant liquid was siphoned off.

The solid was washed 3 times with anhydrous hexane (3×100 mL) at 25° C., recovered, dried under vacuum and analyzed. The final content of donor was 0.1%. The polymerization results obtained by employing it in the ethylene polymerization procedures A and B described above are reported in table 2.

Example 15

The catalyst component was prepared as described in example 14 with the difference that the temperature of the treatment was 100° C. No donor was found in the final solid catalyst component. The polymerization results obtained by employing it in the ethylene polymerization procedure B described above are reported in table 2

Example 16

The catalyst component was prepared as described in example 14 with the difference that 9,9-bis(methoxymethyl)fluorene was used instead acetylacetone. The final content of donor was 1.2%. The polymerization results obtained by employing it in the ethylene polymerization procedures A and B described above are reported in table 2.

Example 17

The catalyst component was prepared as described in example 16 with the difference that the temperature of the treatment was 100° C. The final content of donor was 1.2% The polymerization results obtained by employing it in the ethylene polymerization procedures A and B described above are reported in table 2

Example 18

The catalyst component was prepared as described in example 14 with the difference that 9,9-dimethoxyfluorene was used instead acetylacetone. The final content of donor was 0.1%. The polymerization results obtained by employing it in the ethylene polymerization procedure A described above are reported in table 2.

Comparative Example 1

The catalyst was prepared as described in example 1 without using $AlCl_3$. The results are reported in table 1.

Example 19

Preparation of a Broad MWD PE in a Cascade Polymerization Process

The polymerization process was carried out in a plant working continuously and basically equipped with a small reactor (pre-contacting pot) in which the catalyst components are mixed to form the catalytic system, a second vessel receiving the catalytic system formed in the previous step also equipped with mixing means, and two fluidized bed reactors (polymerization reactors) which are kept under fluidization conditions with propane.

The following reactants are fed to the pre-contacting pot:
- the solid catalyst component prepared as described in example 7
- liquid propane as diluent
- a solution of aluminum alkyl compound The temperature is in the range of 10-60° C. and the residence time (first and second vessel) ranges from 15 minutes to 2 hrs. The so obtained catalytic system was directly fed from the pre-contacting section (first and second vessel) to the first gas-phase fluidized bed reactor operated at under the conditions reported in Table 1. The polymer produced in the first gas-phase reactor was then transferred to a second gas-phase reactor working under conditions reported in Table 3.

The polymer discharged from the final reactor was first transferred to the steaming section and then dried at 70° C. under a nitrogen flow and weighted. The polymer properties are reported in table 4.

Example 20

The polymerization was carried out as described in example 19 with the difference that the catalyst prepared according to the disclosure of example 17 was used. The results an conditions are reported in tables 3 and 4.

TABLE 1

| Example | Mg Wt. % | Ti wt. % | Al wt. % | Cl wt. % | $OR^I$ wt. % | LA factor | LA/(Al + Ti) | Porosity (Hg method) $P_F$ cm$^3$/g |
|---|---|---|---|---|---|---|---|---|
| 1 | 18.5 | 5.2 | 1.3 | 67.1 | 0.3 | 1.84 | 1.28 | 0.611 |
| 2 | 17.5 | 5.7 | 2.1 | 65.8 | 1.4 | 2.21 | 1.33 | 0.534 |
| 3 | 17.7 | 5.7 | 2.2 | 67.1 | 1.8 | 2.08 | 1.23 | 0.559 |
| 4 | 18.3 | 4.7 | 2.1 | 65.9 | <0.1 | 2.77 | 1.53 | 0.566 |
| 5 | 17.7 | 5.0 | 2.0 | 65.3 | 0.3 | 2.41 | 1.41 | 0.558 |
| 6 | 17.4 | 6.4 | 2.3 | 65.0 | 0.4 | 2.83 | 1.72 | 0.555 |
| 7 | 17.4 | 6.2 | 2.2 | 66.3 | 0.5 | 2.45 | 1.49 | 0.544 |
| 8 | 17.1 | 5.5 | 2.5 | 65.5 | 0.9 | 2.37 | 1.31 | 0.526 |
| 9 | 18.4 | 4.2 | 2.1 | 68.9 | <0.1 | 1.77 | 0.94 | 0.515 |
| 10 | 17.7 | 4.0 | 2.5 | 63.0 | 1.0 | 3.27 | 1.63 | 0.502 |
| 11 | 18.2 | 4.9 | 2.1 | 65.4 | 2.5 | 2.39 | 1.35 | 0.532 |
| 12 | 17.9 | 5.1 | 2.1 | 64.7 | — | | | 0.530 |
| 13 | 16.6 | 5.4 | 2.8 | 66.9 | — | 1.79 | 0.94 | 0.526 |
| Comp. 1 | 19.0 | 6.4 | | 66.7 | — | | 1.43 | 0.643 |

TABLE 2

| Example | Pol. Procedure | Yield KgPE/gcat | MIE dg/min | BDP g/cm3 | Polymer morphology |
|---|---|---|---|---|---|
| 1 | A | 5.5 | 114 | 0.378 | spherical |
| 2 | A | 9.2 | | 0.355 | spherical |
| 3 | A | 7.6 | | 0.342 | spherical |
| 4 | A | 5.0 | 70 | 0.405 | spherical |
| 5 | A | 5.2 | 70 | 0.392 | spherical |
| 6 | A | 4.1 | 41 | 0.406 | spherical |
| 7 | A | 5.7 | 162 | 0.376 | spherical |
| 8 | A | 7.6 | | 0.380 | spherical |
| 9 | A | 5.1 | 106 | 0.346 | spherical |
| 10 | A | 4.3 | | 0.364 | spherical |
| 11 | A | 6.8 | 139 | 0.347 | spherical |
| 12 | A | 4.1 | 84 | 0.356 | spherical |
| 13 | A | 8.8 | 110 | 0.365 | Spherical |
| 14 | A | 4.1 | 74 | 0.402 | Spherical |
| | B | 3.2 | 95 | 0.3 | Spherical/broken |
| 15 | B | 2.9 | 95 | 0.34 | Spherical with some broken |
| 16 | A | 5.2 | 122 | 0.4 | Spherical |
| | B | 3.6 | 122 | 0.26 | Spherical/broken |
| 17 | A | 4.4 | 115 | 0.399 | Spherical |
| | B | 5.4 | 135 | 0.345 | Spherical |
| 18 | A | 5.8 | 108 | 0.393 | Spherical |
| Comp. 1 | A | 13.6 | 113 | 0.269 | broken |

TABLE 3

Pre-contacting

| | | 1$^{st}$ Vessel | | | 2$^{nd}$ vessel | |
|---|---|---|---|---|---|---|
| Cat. (g/h) | $AlR_3$ type | $AlR_3$/Cat. (g/g) | Time (min) | T (° C.) | Time (min) | T° (° C.) |
| 10 | TiBA | 5 | 14 | 50 | 60 | 50 |
| 10 | TiBA | 4 | 14 | 50 | 60 | 50 |

First Fluidized bed reactor

| $C_2^-$ (mol %) | $H_2/C_2^-$ (mol) | Time (hr) | P barg | T (° C.) | Yield (Kg/h) |
|---|---|---|---|---|---|
| 9.3 | 3.8 | 1.6 | 24 | 75 | 70 |
| 7.8 | 3.9 | 2.0 | 24 | 75 | 66 |

Second Fluidized-bed reactor

| Time (hr) | T (° C.) | P barg | $C_2H_4$ (mol %) | $H_2/C_2^-$ (mol) | C6-/C2+C6- (mol) | Yield (Kg/h) |
|---|---|---|---|---|---|---|
| 1.6 | 75 | 24 | 4.4 | 0.061 | 0.070 | 153 |
| 1.8 | 85 | 24 | 6.0 | 0.065 | 0.068 | 145 |

TABLE 4

Final polymer

| | 19 | 20 |
|---|---|---|
| MIP (g/10') | 0.29 | 0.28 |
| MIF/MIP | 37.9 | 29.7 |
| Bulk Density (Kg/dm$^3$) | 0.463 | 0.487 |
| Gel Number | | |
| <0.2 | 170 | 120 |
| 0.5 ÷ 0.7 | 3 | 8 |
| 0.7 ÷ 1.5 | 0 | 0 |
| >1.5 | 0 | 0 |

The invention claimed is:

1. Catalyst components for the polymerization of olefins comprising Ti, Mg, Al, Cl, and optionally $OR^I$ groups in which $R^I$ is a C1-C20 hydrocarbon group, optionally containing heteroatoms in an amount to give a molar $OR^I/Ti$ ratio lower than 0.5, wherein substantially all the titanium atoms are in valence state of 4, a porosity ($P_F$), measured by the mercury method and due to pores with radius equal to or lower than 1 μm, is at least 0.3 cm³/g and a Cl/Ti molar ratio is lower than 28.

2. The solid catalyst component according to claim 1 in which the porosity ($P_F$) is higher than 0.40 cm³/g.

3. The solid catalyst component according to claim 1 in which the amount of Al is lower than that of Ti.

4. The solid catalyst component according to claim 1 further characterized by a "LA" factor higher than 0.5, where the "LA" factor is the molar equivalent of anionic species lacking in order to satisfy all the molar equivalents of the cations present in the solid catalyst component which are not been satisfied by the total molar equivalent of the anions present in the solid catalyst component, all of the molar equivalents of anions and cations being referred to the Ti molar amount.

5. The solid catalyst component according to claim 1 further comprising an LA/(Al+Ti), ratio, where Al and Ti are reported in molar amount referred to the molar amount of Ti, higher than 0.4.

6. The solid catalyst component according to claim 1 containing aluminum chloride selected from the groups consisting of aluminum compounds of formula $AlClL_2$ where L is independently, $OR^I$ groups or chlorine.

7. A process for the polymerization of olefins carried out in the presence of a catalyst system comprising the product of the reaction of a solid catalyst component according to claim 1 and an alkylaluminum compound.

8. The process according to claim 7 carried out in gas-phase.

9. The process of claim 8 carried out in at least two reactors working under different concentrations of molecular weight regulator.

10. The solid catalyst component of claim 2 further comprising a total porosity ($P_T$), measured by the mercury method, in the range of 0.60 to 1.50 cm³/g and a difference ($P_T$-$P_F$) in the range of 0.15-0.50.

* * * * *